United States Patent
Reno et al.

(10) Patent No.: US 10,494,012 B2
(45) Date of Patent: Dec. 3, 2019

(54) TRAVEL CONTROL SYSTEM FOR CAM ASSEMBLY

(71) Applicant: STEERING SOLUTIONS IP HOLDING CORPORATION, Saginaw, MI (US)

(72) Inventors: Tyler M. Reno, Frankenmuth, MI (US); Randy Jones, North Branch, MI (US); Justin D. Mills, Clio, MI (US); Floyd E. Eschenbacher, Jr., Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 61 days.

(21) Appl. No.: 15/712,466

(22) Filed: Sep. 22, 2017

(65) Prior Publication Data

US 2019/0092368 A1 Mar. 28, 2019

(51) Int. Cl.
*B62D 1/184* (2006.01)
*B62D 3/12* (2006.01)
*B62D 7/16* (2006.01)
*B62D 1/189* (2006.01)
*B62D 1/185* (2006.01)

(52) U.S. Cl.
CPC .......... *B62D 1/184* (2013.01); *B62D 1/185* (2013.01); *B62D 1/189* (2013.01); *B62D 3/12* (2013.01); *B62D 7/16* (2013.01)

(58) Field of Classification Search
CPC ........ B62D 1/184; B62D 1/185; B62D 1/187; B62D 1/189; B62D 3/12; B62D 7/16; F16B 7/1427; F16B 7/1454; G05G 1/00
See application file for complete search history.

(56) References Cited

U.S. PATENT DOCUMENTS

| | | | | |
|---|---|---|---|---|
| 5,117,707 A | * | 6/1992 | Kinoshita | B62D 1/184 280/775 |
| 5,213,004 A | * | 5/1993 | Hoblingre | B62D 1/184 403/92 |
| 5,301,567 A | * | 4/1994 | Snell | B62D 1/184 280/775 |
| 5,570,610 A | * | 11/1996 | Cymbal | B62D 1/184 74/493 |
| 6,860,669 B2 | * | 3/2005 | Laisement | B62D 1/184 280/775 |
| 6,952,979 B2 | * | 10/2005 | Cartwright | B62D 1/184 280/775 |

(Continued)

FOREIGN PATENT DOCUMENTS

| | | | | |
|---|---|---|---|---|
| DE | 102008029247 A1 | * | 12/2009 | B62D 1/184 |
| EP | 1747966 A2 | * | 1/2007 | B62D 1/184 |

(Continued)

*Primary Examiner* — Laura Freedman

(57) ABSTRACT

A travel control system for a cam assembly includes a cam having a plurality of lobes on a first face of the cam. Also included is a cam follower engageable with the first face of the cam to follow the lobe profile defined by the plurality of lobes. Further included is a pair of cam prongs extending outwardly from an outer perimeter of the cam. Yet further included is a lock indicator cam follower tab in contact with a first cam prong of the pair of cam prongs in a locked position of the cam assembly and in contact with a second cam prong of the pair of cam prongs in an unlocked position of the cam assembly.

1 Claim, 4 Drawing Sheets

(56) References Cited

U.S. PATENT DOCUMENTS

| | | | | |
|---|---|---|---|---|
| 7,267,025 B2 * | 9/2007 | Ko | B62D 1/184 | 74/493 |
| 7,717,011 B2 * | 5/2010 | Hirooka | B62D 1/184 | 280/777 |
| 8,042,426 B2 * | 10/2011 | Jo | B62D 1/184 | 280/775 |
| 8,336,413 B2 * | 12/2012 | Dodak | B62D 3/12 | 188/267.1 |
| 8,590,932 B2 * | 11/2013 | Dietz | B62D 1/184 | 280/775 |
| 8,826,767 B2 * | 9/2014 | Maniwa | B62D 1/184 | 280/775 |
| 8,869,647 B2 * | 10/2014 | Hirooka | B62D 1/184 | 280/775 |
| 8,991,863 B2 * | 3/2015 | Hahn | B62D 1/184 | 280/775 |
| 9,032,835 B2 * | 5/2015 | Davies | B62D 1/184 | 74/493 |
| 9,120,502 B2 * | 9/2015 | Mihara | B62D 1/184 | |
| 9,150,241 B2 * | 10/2015 | Nakazato | B62D 1/187 | |
| 9,393,986 B1 * | 7/2016 | Anspaugh | B62D 1/184 | |
| 9,522,693 B2 * | 12/2016 | Tomaru | B62D 1/184 | |
| 9,758,188 B1 * | 9/2017 | Buzzard | B62D 1/184 | |
| 9,849,905 B2 * | 12/2017 | Anspaugh | B62D 1/184 | |
| 10,093,339 B2 * | 10/2018 | Bodtker | B62D 1/184 | |
| 2015/0360712 A1 * | 12/2015 | Baumeister | B62D 1/184 | 403/53 |

FOREIGN PATENT DOCUMENTS

| | | | | |
|---|---|---|---|---|
| EP | 1747967 A2 * | 1/2007 | | B62D 1/184 |
| EP | 1795425 A2 * | 6/2007 | | B62D 1/184 |
| FR | 2834680 A1 * | 7/2003 | | B62D 1/184 |
| JP | 2015140043 A * | 8/2015 | | |

* cited by examiner

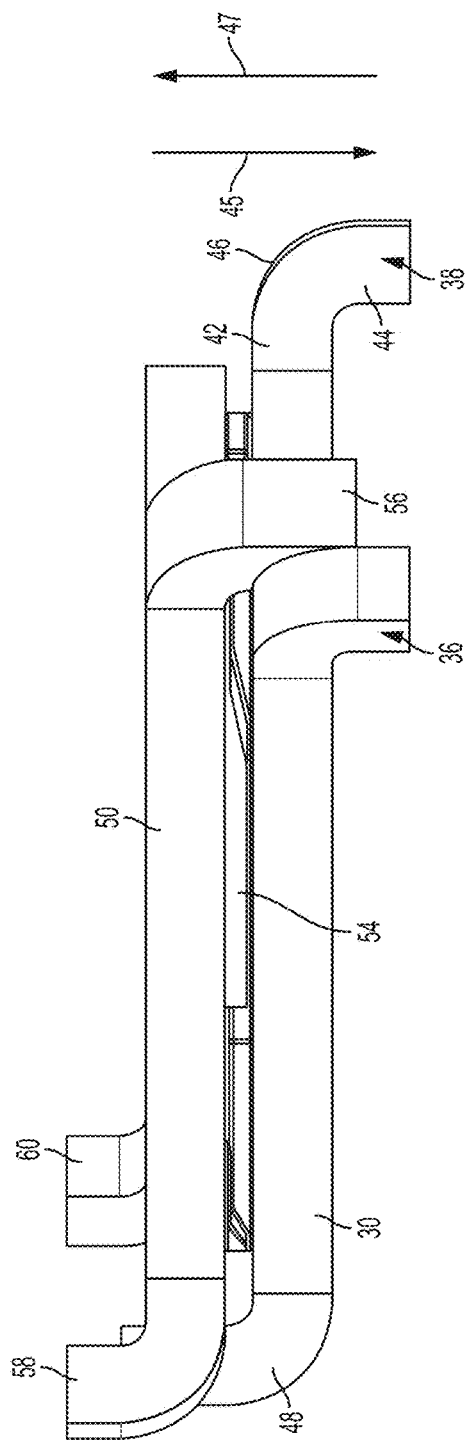
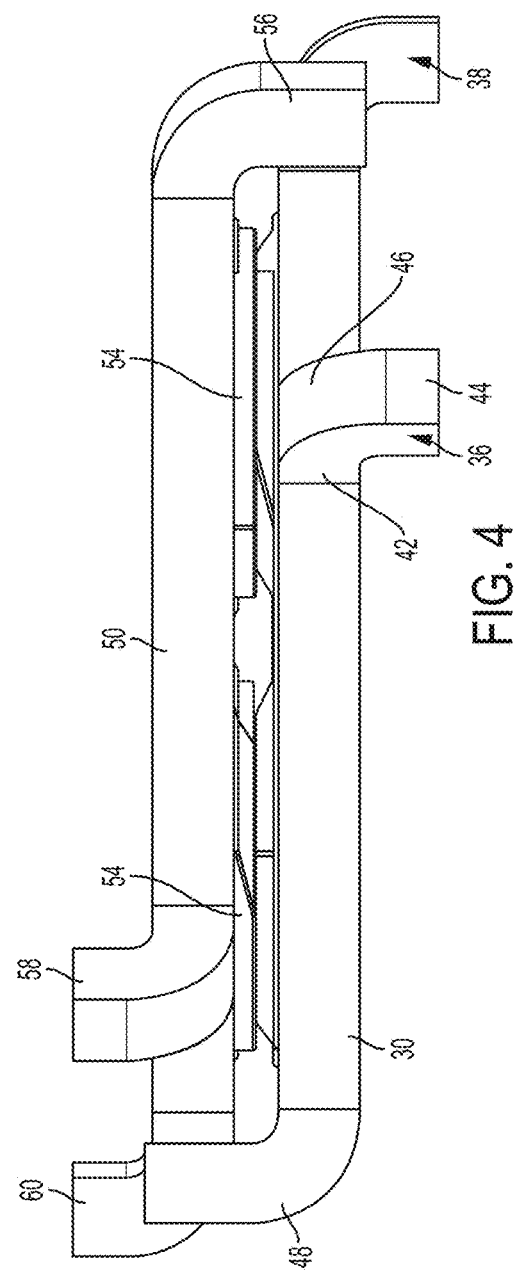
FIG. 3
FIG. 4

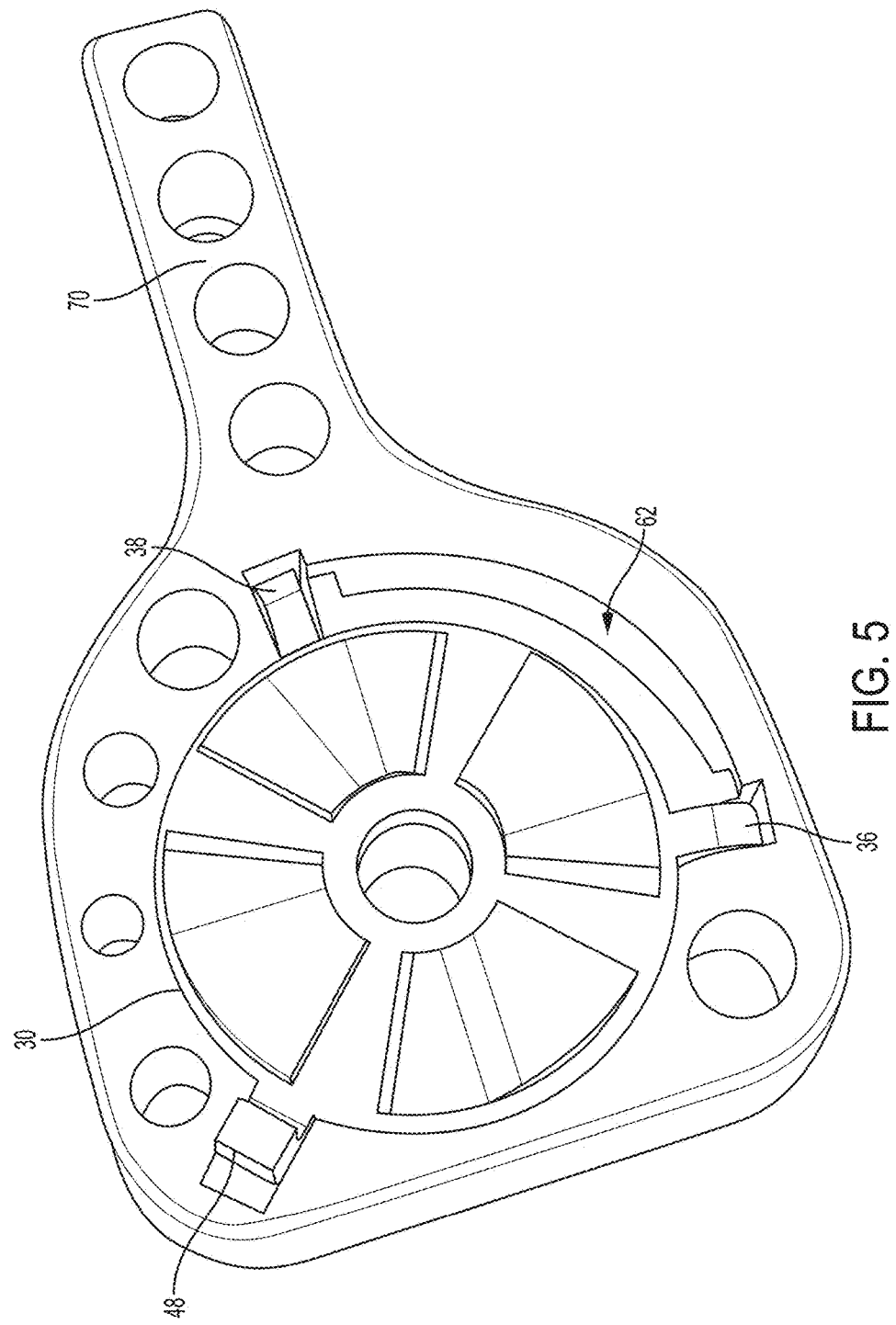

TRAVEL CONTROL SYSTEM FOR CAM ASSEMBLY

BACKGROUND

The following description relates to cam assemblies and, more particularly, to a travel control system for cam assemblies.

Cam assemblies are utilized in a variety of mechanical applications. Some cam assemblies include a cam and a cam follower. Cam followers come in a vast array of configurations, but each type of cam follower follows a cam lobe profile. Manufacturing a cam and a cam follower with different structural features is expensive due to the need for two different molds and/or two different sets of tooling depending on type of material being made. Additionally, travel stops for the cam assembly often require separate manufacturing steps in the production of other components, such as a rake lever in a steering column assembly application. These additional manufacturing steps increase overall cost and manufacturing complexity.

SUMMARY OF THE INVENTION

According to one aspect of the disclosure, a travel control system for a cam assembly, the travel control system including a cam having a plurality of lobes on a first face of the cam. Also included is a cam follower engageable with the first face of the cam to follow the lobe profile defined by the plurality of lobes. Further included is a pair of cam prongs extending outwardly from an outer perimeter of the cam. Yet further included is a lock indicator cam follower tab in contact with a first cam prong of the pair of cam prongs when the cam assembly is in a locked position and wherein the lock indicator cam follower tab is in contact with a second cam prong of the pair of cam prongs when the cam assembly is in an unlocked position.

According to another aspect of the disclosure, a travel control system for a cam assembly includes a cam having a plurality of lobes on a first face of the cam to define a lobe profile. Also included is a cam follower engageable with the first face of the cam to follow the lobe profile. Further included is a tab extending outwardly from an outer perimeter the cam. Yet further included is a slot defined by the cam follower and having a first slot end wall and a second slot end wall, the tab in contact with the first slot end wall in a locked position of the cam assembly and in contact with the second slot end wall in an unlocked position of the cam assembly.

According to yet another aspect of the disclosure, a steering column assembly includes at least one jacket and a rake lever. Also included is a cam assembly including a cam having a plurality of lobes on a first face of the cam to define a lobe profile. The cam assembly also includes a cam follower having an identical structure to the cam and engageable with the first face of the cam to follow the lobe profile defined. The cam assembly further includes at least one prong extending outwardly from one of the cam and the cam follower, the at least one prong engageable with a first travel stop to define a first position of the cam assembly and engageable with a second travel stop to define a second position of the cam assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is an elevational view of the cam and a cam follower in a first position of the cam assembly;

FIG. 4 is an elevational view of the cam and the cam follower in a second position of the cam assembly; and FIG. 5 is a perspective view of the cam assembly assembled in a rake lever.

DETAILED DESCRIPTION

Referring now to the Figures, where the invention will be described with reference to specific embodiments, without limiting same, various features of a travel control system for a cam assembly are illustrated. In some embodiments, the cam assembly is employed in a steering column assembly of a vehicle. Numerous applications in a steering column assembly are contemplated.

Figure 1:
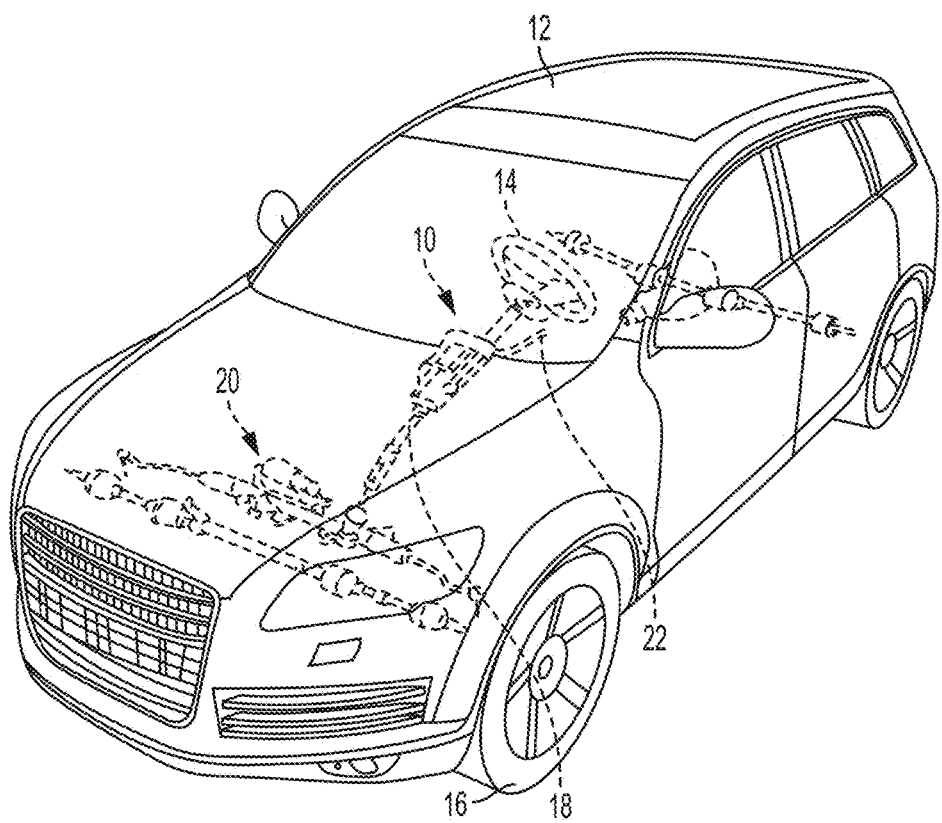
FIG. 1 is a perspective view of a steering column assembly disposed in a vehicle.

FIG. 1 illustrates a steering column assembly 10 disposed in a vehicle 12. The steering column assembly 10 operatively connects a steering device, such as a steering wheel 14, to road wheels 16 for control of the road wheels 16. Various types of steering column assemblies 10 may be employed. In the illustrated embodiment, the steering column assembly 10 includes one or more steering shafts 18 surrounded by one or more jackets to couple the steering wheel 14 to a mechanism 20 that is configured to manipulate the road wheels 16 in response to input from the steering wheel 14. The steering column assembly 10 may be adjusted in one or more directions, such as in a telescoping manner or in a tilting manner. A rake and/or tilt lever 22 that facilitates rake and/or tilting motion of the steering column assembly 10 is illustrated.

Figure 2:
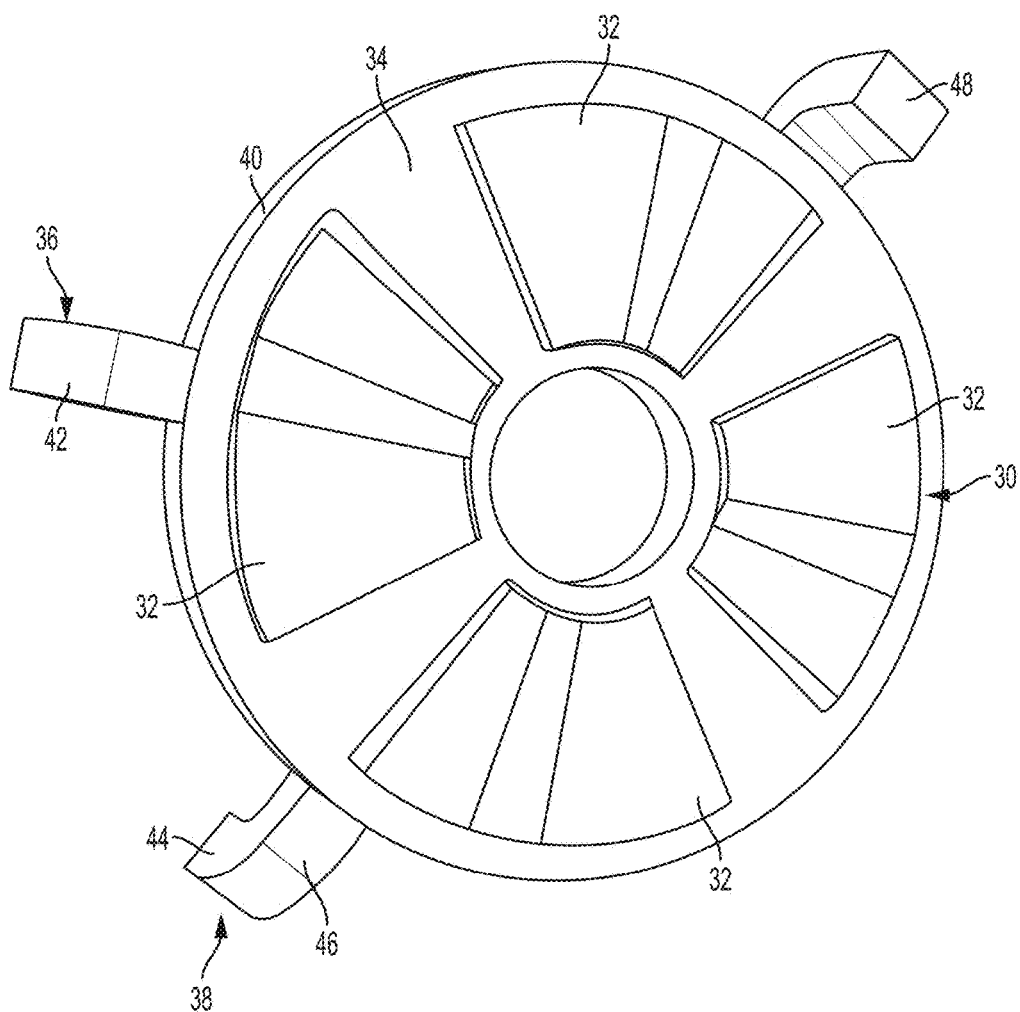
FIG. 2 is a perspective view of a cam of a cam assembly.

Referring to FIG. 2, a cam 30 is illustrated. The cam 30 is part of a cam assembly that may be referred to as a cam and follower system. The cam 30 includes a plurality of lobes 32 on a face 34 of the cam 30. The lobes 32 protrude from the remainder of the face 34, the face 34 being primarily planar in regions that do not contain one of the lobes 32. In the illustrated embodiment, four lobes are shown, but it is to be appreciated that more or fewer lobes may be present depending upon the particular application of use. The lobes 32 may be formed in numerous geometries. Collectively, the lobes 32 define a cam lobe profile.

Referring now to FIGS. 3 and 4, with continued reference to FIG. 2, the cam 30 also includes a pair of cam prongs, referred to as a first cam prong 36 and a second cam prong 38. Each cam prong 36, 38 extends outwardly from an outer perimeter 40 of the cam 30. In some embodiments, the cam prongs 36, 38 include a first prong portion 42 and a second prong portion 44, with the prong portions 42, 44 oriented substantially perpendicular relative to each other, with the prong portions 42, 44 connected by a joint 46, which may be curved. The cam prongs 36, 38 are integrally formed as single prongs. The illustrated and above-described geometry associated with the prongs 36, 38 is merely illustrative and is not intended to be limiting, as alternative prong geometries are contemplated.

The cam 30 also includes a travel prong 48. As shown, the pair of cam prongs 36, 38 extend in a first direction 45. More specifically, the second prong portion 44 of each cam prong 36, 38 extends away from the face 34 in the first direction 45. The travel prong 48 extends in a second direction 47 that is opposite relative to the first direction 45. It is to be appreciated that the cam prongs 36, 38 extend in the second direction 47 and the travel prong 48 extends in the first direction in some embodiments.

A cam follower 50 is shown in engagement with the cam 30. Rather than requiring manufacture of two different components of a cam assembly, the cam 30 and cam follower 50 are formed with substantially identical structures, thereby eliminating the need for separate molds/tooling. This feature reduces manufacturing costs and complexity.

It is to be understood that the cam 30 and the cam follower 50 may be formed of any suitable material and via any suitable manufacturing process. In particular, in some embodiments, the cam 30 and the cam follower 50 may be formed from steel, either machined, stamped or cast. However, as noted above, various plastics, metals, composites, powdered metal, etc. may be employed. The particular material and manufacturing process may vary depending upon the particular application of use.

The cam follower 50 includes another plurality of lobes 54 that correspond to the lobes 32 of the cam 30, such that the corresponding lobe profiles actuate upon movement. The cam follower also includes a lock indicator cam follower tab 56 that is formed substantially identically to the travel prong 48 of the cam 30. The lock indicator cam follower tab 56 is positioned between the pair of cam prongs 36, 38 of the cam 30. Upon abutment of the lock indicator cam follower tab 56 with the second cam prong 38, the cam assembly is in a locked position, as shown in FIG. 4. The locked position results in gaps between the lobes 32, 54 of the cam 30 and the cam follower 50, respectively. Upon abutment of the lock indicator cam follower tab 56 with the first cam prong 36, the cam assembly is in an unlocked position, as shown in FIG. 3. The unlocked position results in the ramps of the lobes 32, 54 of the cam 30 and the cam follower 50 in contact with each other. The cam follower 50 also includes a pair of cam follower prongs 58, 60 that correspond to the pair of cam prongs 36, 38 of the cam 30.

Referring now to FIG. 5, the cam 30 is shown mounted to a generic rake lever 70. The pair of cam prongs 36, 38 act as mounting and locating features relative to the rake lever 70. The travel prong also acts as a mounting and locating feature. The cam prongs 36, 38 are disposed within an arcuate slot 62 defined by the rake lever 70. The travel prong 48 is disposed in a recess or aperture defined by the rake lever 70 to retain the cam 30. The cam prongs 36, 38 also serve as travel stops for the cam follower when mounted thereto, the cam follower being the rake lever 70 in this example. The tab 56 of the cam follower (i.e., rake lever 70) is also disposed in the arcuate slot 62 for movement relative to the cam 30 between the first cam prong 36 and the second cam prong 38. In some embodiments, the cam 30 attaches to a mounting bracket, a lower jacket, or potentially a mating piece (made to mount the cam) that will not rotate relative to the column.

The embodiments described herein provide travel stops built into the cam assembly itself, rather than requiring travel boundaries on other features of the steering column assembly 10. Additionally, manufacturing cost and complexity is reduced with the identical structure of the cam 30 and the cam follower 50.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A travel control system for a cam assembly, the travel control system comprising:

a cam having a plurality of lobes on a first face of the cam defining a lobe profile;

a cam follower engageable with the first face of the cam to follow the lobe profile, the cam assembly provided in a steering column assembly, the cam assembly comprising a rake lever of the steering column assembly, the rake lever being one of the cam and cam follower;

a pair of cam prongs extending outwardly from an outer perimeter of the cam; and a lock indicator cam follower tab in contact with a first cam prong of the pair of cam prongs when the cam assembly is in a locked position and wherein the lock indicator cam follower tab is in contact with a second cam prong of the pair of cam prongs when the cam assembly is in an unlocked position, the rake lever defines an arcuate slot, the pair of cam prongs and the lock indicator cam follower tab disposed in the arcuate slot for movement therein.

* * * * *